(12) United States Patent
Liu et al.

(10) Patent No.: US 7,540,453 B2
(45) Date of Patent: Jun. 2, 2009

(54) POSITION ADJUSTING DEVICE

(75) Inventors: Yung-Kuang Liu, Science Park (TW);
Wei-Szu Lin, Hsinchu (TW);
Wan-Chang Fan, Hsinchu (TW);
Tun-Hsing Hsiang, Hsinchu (TW)

(73) Assignee: Young Optics, Inc., Hsinchu (TW)

( * ) Notice: Subject to any disclaimer, the term of this patent is extended or adjusted under 35 U.S.C. 154(b) by 0 days.

(21) Appl. No.: 12/031,260

(22) Filed: Feb. 14, 2008

(65) Prior Publication Data

US 2009/0001228 A1     Jan. 1, 2009

(30) Foreign Application Priority Data

Jun. 26, 2007    (TW) ............................... 96210379 U

(51) Int. Cl.
*F16L 3/08*     (2006.01)
(52) U.S. Cl. ...................................... 248/65
(58) Field of Classification Search .................. 248/65, 248/68.1, 671, 694, 200, 49, 346.06
See application file for complete search history.

(56) References Cited

U.S. PATENT DOCUMENTS

| | | | |
|---|---|---|---|
| 4,098,476 A * | 7/1978 | Jutte et al. | 248/694 |
| 6,293,320 B1 * | 9/2001 | McGregor, II | 144/1.1 |
| 6,830,225 B2 * | 12/2004 | Kato | 248/49 |
| 6,968,864 B2 * | 11/2005 | Miyamoto et al. | 138/110 |
| 7,252,457 B2 * | 8/2007 | Humphries et al. | 405/35 |
| 2007/0199227 A1 * | 8/2007 | Ertl | 42/137 |

* cited by examiner

*Primary Examiner*—Ramon O Ramirez
(74) *Attorney, Agent, or Firm*—Occhiuti Rohlicek & Tsao LLP

(57) ABSTRACT

A position adjusting device includes a base unit with spaced-apart first and second lateral plates. A bracket is elongated and interposed between the first and second lateral plates for mounting an integration rod, and includes opposite first and second open ends. A connecting mechanism includes two resilient pins connected respectively between the bracket and the first lateral plate and between the bracket and the second lateral plate. The resilient pins are proximate to the first open end of the bracket. An adjusting member extends through the first lateral plate, and abuts against one side of the bracket proximate to the second open end. The adjusting member drives the bracket to move along a first axis and a second axis perpendicular to the first axis. The first and second axes are perpendicular to an extension direction of the bracket.

12 Claims, 12 Drawing Sheets

POSITION ADJUSTING DEVICE

CROSS-REFERENCE TO RELATED APPLICATION

This application claims priority of Taiwanese Application No. 096210379, filed on Jun. 26, 2007.

BACKGROUND OF THE INVENTION

1. Field of the Invention

The invention relates to a position adjusting device, more particularly to a position adjusting device for adjusting the position of an integration rod.

2. Description of the Related Art

As shown in FIGS. 1 and 2, a conventional position adjusting device 10 mounted and secured in a casing (not shown) of an optical projector system is used for mounting and positioning an integration rod 11. The integration rod 11 is primarily used to homogenize an illuminating beam 12 received thereby. The position adjusting device 10 is formed integrally from metal material by press-casting. The position adjusting device 10 includes a base 101 in a form of a substantially square-shaped frame and secured in the casing, a substantially square-shaped frame 102 disposed in the base 101, and a mounting member 103 disposed within the frame 102. The frame 102 is connected to the base 101 by means of first pins 104 projecting respectively from opposite left and right sides thereof. The mounting member 103 is connected to the frame 102 by means of two second pins 105 projecting respectively from opposite upper and lower sides thereof. The integration rod 11 is fixed within the mounting member 103 by glue. Thus, the illuminating beam 12 enters into the integration rod 11 through a light entrance 111 of the integration rod 11 and is outputted through a light exit 112 of the integration rod 11.

The position adjusting device 10 is further provided with a first adjusting screw (not shown) abutting against an outer surface of a sidewall 106 of the mounting member 103, and a second adjusting screw (not shown) abutting against an outer surface of a top wall 107 of the mounting member 103. The first and second adjusting screws are respectively adjacent to the light exit 112 of the integration rod 11. By means of the first adjusting screw which applies a horizontal force (I) to the sidewall 106, the mounting member 103 deviates along an X-axis direction about the second pins 105 so as to fine-tune the position of the light exit 112 of the integration rod 11 in the X-axis direction. A vertical force (II) applied by the second adjusting screw to the top wall 107 causes the mounting member 103 to displace along a Y-axis direction about the first pins 104 so as to fine-tune the position of the light exit 112 of the integration rod 11 in the Y-axis direction. In addition, since the first pins 104 and the second pins 105 are formed integrally between the base 101 and the frame 102, and between the frame 102 and the mounting member 103, respectively, after loosening of the first and second adjusting screws, the second and first pins 105, 104 of metal material immediately deform resiliently so as to restore the mounting member 103 to its original position. By fine-tuning the position of the light exit 112 of the integration rod 11, the light spot of the illuminating beam 12 which is irradiated through the light exit 112 is accurately aligned with a chip area (not shown) of a digital micro-mirror device (DMD) of the optical projector system.

However, the position adjusting device 10 requires the arrangement of the first adjusting screw and the second pins 105, as well as the arrangement of the second adjusting screw and the first pins 104, in order to fine-tune the mounting member 103 to cause the same to deviate along X-axis and Y-axis directions, respectively, thereby rendering the design of the entire structure relatively complicated. This not only increases the complexity in designing molds, products thus molded are also difficult to be released from the molds. Thus, the position adjusting device 10 is not suitable for production using molds.

SUMMARY OF THE INVENTION

Other objectives, features and advantages of the present invention will be further understood from the further technology features disclosed by the embodiments of the present invention wherein there are shown and described preferred embodiments of this invention, simply by way of illustration of modes best suited to carry out the invention.

In order to achieve a part or all of the objects or other objects, according to an embodiment of the present invention, a position adjusting device for adjusting the position of an integration rod is provided, in which the integration rod is fine-tuned to displace along two axial directions with the design of a single pin unit.

In order to achieve a part or all of the objects or other objects, according to an embodiment of the present invention, there is provided a position adjusting device for adjusting the position of an integration rod, which is simple in structure and which is suitable for production using molds.

Accordingly, a position adjusting device of an embodiment of the present invention is adapted for mounting an integration rod and for adjusting the position of the integration rod. The position adjusting device includes a base unit, a bracket, a connecting mechanism, and an adjusting member.

The base unit includes oppositely spaced-apart first and second lateral plates that extend in a same direction. The bracket is elongated, and is interposed between the first and second lateral plates. The bracket is adapted for mounting the integration rod, and includes a first open end and a second open end opposite to the first open end. The connecting mechanism includes two resilient pins connected respectively between the bracket and the first lateral plate and between the bracket and the second lateral plate. Each of the resilient pins is proximate to the first open end of the bracket. The adjusting member extends through the first lateral plate, and abuts against one side of the bracket that is proximate to the second open end. The adjusting member is capable of driving the bracket to move along both a first axis and a second axis perpendicular to the first axis. The first and second axes are both perpendicular to an extension direction of the bracket.

According to an embodiment of the present invention, the bracket includes a guide groove oriented toward the first lateral plate. The first lateral plate has a screw hole corresponding in position to the guide groove. The adjusting member is an eccentric screw that engages threadedly the screw hole, and that abuts against an inner wall of the guide groove.

According to an embodiment of the present invention, the guide groove is substantially rectangular, and has an extension direction the same as that of the bracket. The adjusting member includes a first post threadedly engaged in the screw hole, and a second post formed on a distal end of the first post and abutting against the inner wall of the guide groove. Centers of the second and first posts do not coincide.

According to an embodiment of the present invention, the first axis is the same as the extension direction of the adjusting member. The adjusting member can push the bracket along the first axis such that the bracket moves along both the first axis and the second axis to adjust the position of the second open end of the bracket.

According to an embodiment of the present invention, the second post has a diameter substantially equal to a width of the guide groove. The second post rotatably abuts against an inner wall of the guide groove.

According to an embodiment of the present invention, the resilient pins extend respectively from two opposite sides of the bracket proximate to the first open end toward the second open end and slantingly outward to connect respectively to the first and second lateral plates.

Due to the arrangement of the two resilient pins of the connecting mechanism, the adjusting member independently drives the bracket to deviate along both the first axis and the second axis so as to fine-tune the position of the light exit of the integration rod, thereby reducing structural design complexity and rendering the present invention suitable for production using molds.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing, " "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
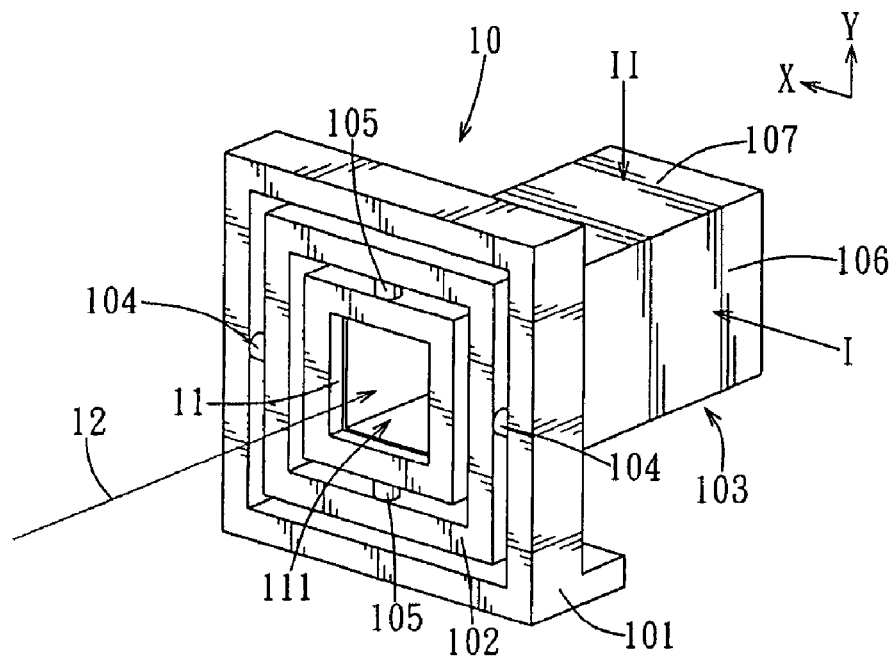
FIG. 1 is a perspective view of a conventional position adjusting device.
Figure 2:
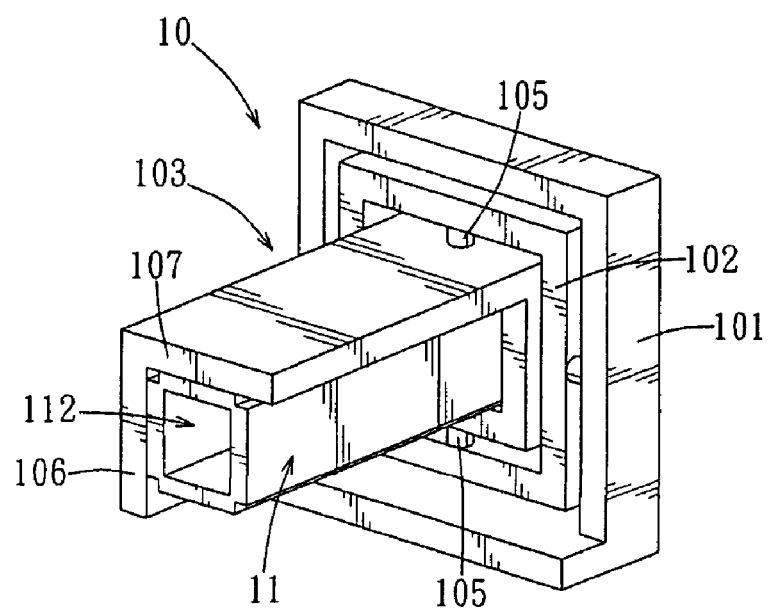
FIG. 2 is a perspective view of the conventional position adjusting device of FIG. 1 when viewed from another angle.
Figure 3:
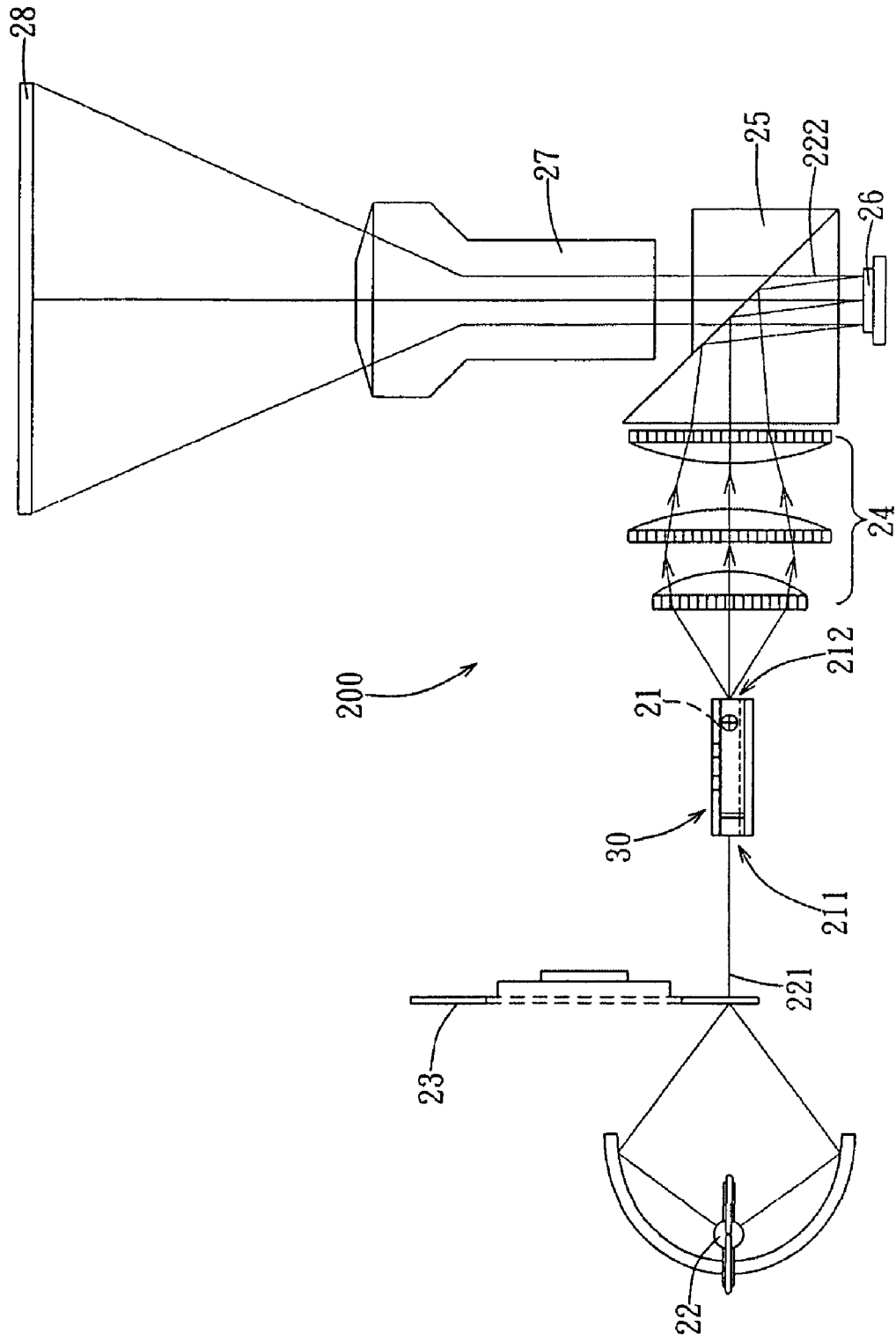
FIG. 3 is a schematic view to illustrate a first preferred embodiment of a position adjusting device when applied to an optical system, the position adjusting device being adapted to fine-tune the position of a light exit of an integration rod.

FIG. 3 is a schematic view of a first preferred embodiment of a position adjusting device 30 according to the present invention when applied to an optical projector system 200. Referring to both FIG. 3 and FIG. 4, the position adjusting device 30 is mounted and secured in a casing (not shown) of the optical projector system 200 for mounting and positioning an integration rod 21 of the optical projector system 200. In the optical projector system 200, a light source 22 provides an illuminating beam 221, which passes successively through a color wheel 23, the integration rod 21 and a relay lens unit 24, and which is reflected by a total internal reflection prism 25 to a digital micro-mirror device 26. The illuminating beam 221 is reflected selectively by the digital micro-mirror device 26 for conversion into an image beam 222. A projector lens 27 is used to project the image beam 222 onto a screen 28 to display an image. The integration rod 21 has a light entrance 211 for entry of the illuminating beam 221, and a light exit 212 for output of the illuminating beam 221. The light exit 212 is aligned with the position of the relay lens unit 24.

In the following description, the right side of the position adjusting device 30 as shown in FIG. 3 is referred to as the front side, and the side opposite thereto is referred to as the rear side. It is particularly noted that directional terms such as "front side" and "rear side" as used in the preferred embodiments merely refer to directions based on the drawings and are not intended to limit the scope of the present invention.

Figure 4:
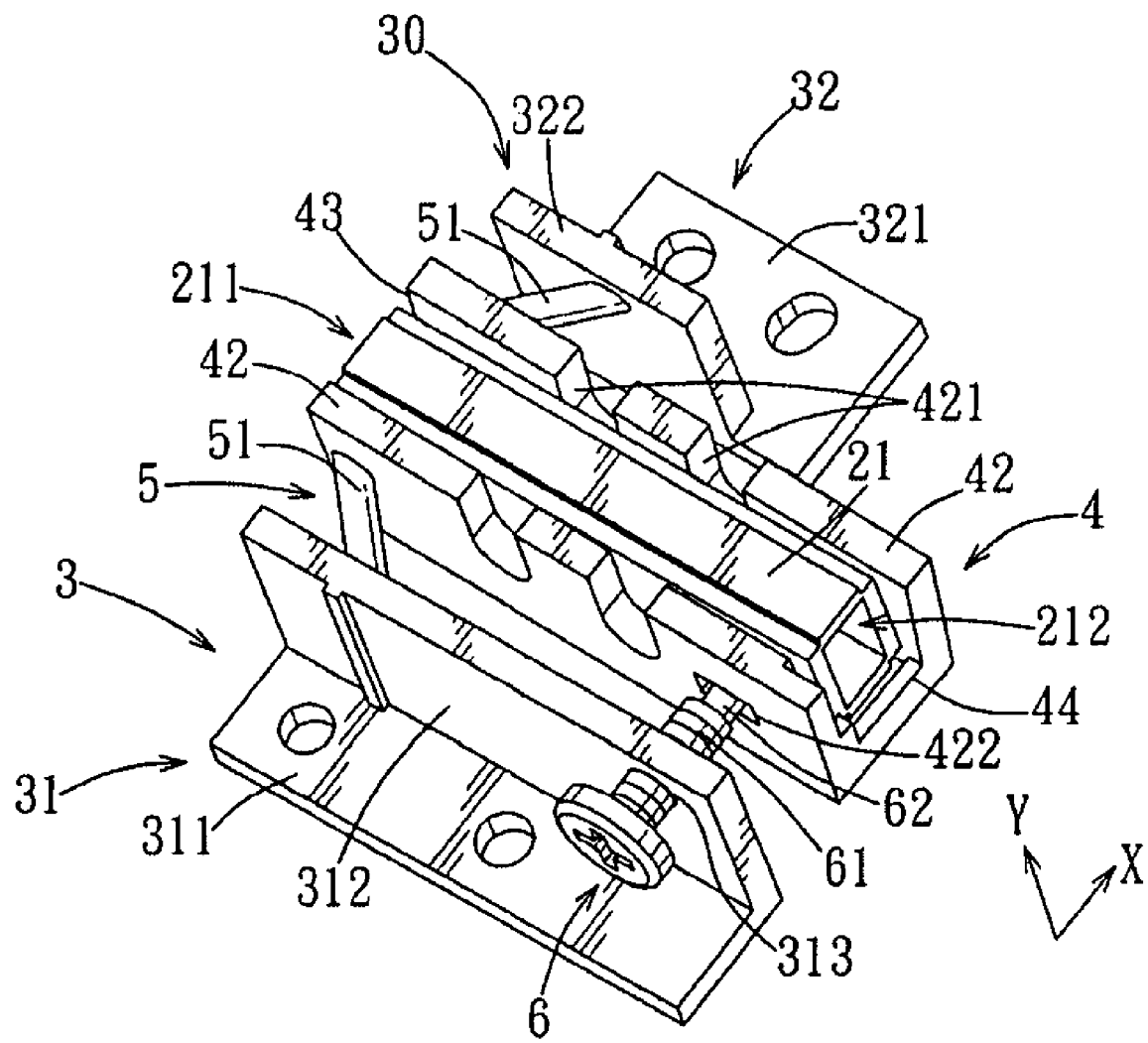
FIG. 4 is a perspective view of the first preferred embodiment of the position adjusting device according to the present invention.
Figure 5:
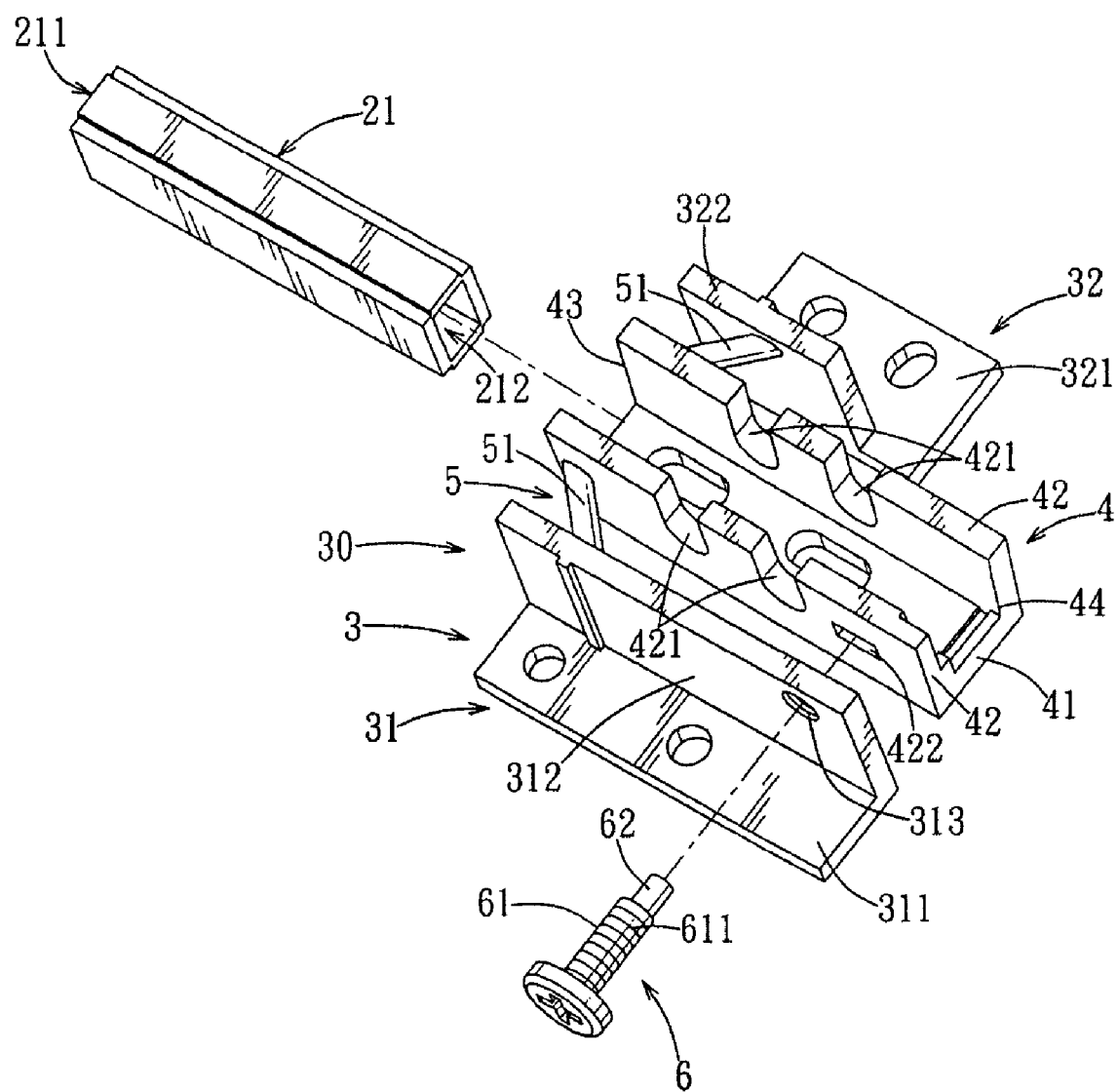
FIG. 5 is an exploded perspective view of the first preferred embodiment of the position adjusting device according to the present invention to illustrate the arrangement relationship between the position adjusting device and the integration rod.

As shown in FIGS. 4 and 5, the position adjusting device 30 includes a base unit 3, a bracket 4, a connecting mechanism 5, and an adjusting member 6. The base unit 3 includes a first base body 31 and a second base body 32 disposed separately at one side of the first base body 31. The first base body 31 has a first bottom plate 311, and a first lateral plate 312 extending vertically upward from an inner side of the first bottom plate 311. The second base body 32 is substantially similar to the first base body 31 in construction, and includes a second bottom plate 321 and a second lateral plate 322 extending vertically upward from an inner side of the second bottom plate 321. The first lateral plate 312 has a screw hole 313 adjacent to a front side thereof. The bracket 4 has a substantially U-shaped cross section with an opening that faces upward, and extends in a front-and-rear direction so as to have an elongated shape. The bracket 4 is interposed between the first and second lateral plates 312, 322, and includes a bottom wall 41, two lateral walls 42 extending vertically upward from two opposite sides of the bottom wall 41, and first and second open ends 43, 44 cooperatively defined by the bottom wall 41 and the two lateral walls 42. The first and second open ends 43, 44 are respectively oriented toward the rear side and the front side. Each of the lateral walls 42 is provided with two generally U-shaped recesses 421 having openings that face upward. The lateral wall 42 proximate to the first lateral plate 312 has a guide groove 422 corresponding in position to the screw hole 313. The guide groove 422 extends lengthwise in the front-and-rear direction, and is substantially rectangular in shape.

The connecting mechanism 5 includes two resilient pins 51 that are connected respectively between one of the lateral walls 42 of the bracket 4 and the first lateral plate 312 and between the other of the lateral walls 42 of the bracket 4 and the second lateral plate 322. The two resilient pins 51, the base unit 3, and the bracket 4 are integrally formed from a magnesium alloy material by press-casting. The two resilient pins 51 extend respectively in a forward and outward slanting manner from outer surfaces of the two lateral walls 42 of the bracket 4 proximate to the first open end 43 to be connected to the first and second lateral plates 312, 322, respectively. The adjusting member 6 is an eccentric screw, and includes a first post 61 and a second post 62 formed at a distal end of the first post 61. Centers of the second post 62 and the first post 61 do not coincide, and the first post 61 has an outer surface provided with an outer thread 611.

When assembling the integration rod 21 to the position adjusting device 30, the integration rod 21 is placed on the bracket 4 such that the integration rod 21 is located between the two lateral walls 42, such that the light entrance 211 is oriented toward the rear side, and such that the light exit 212 is oriented toward the front side. Subsequently, glue (not shown) is applied to the recesses 421 in the lateral walls 42. When the glue is dried, the integration rod 21 is secured firmly on the bracket 4. On the other hand, the adjusting member 6 is inserted through the screw hole 313 from the outer side of the first lateral plate 312 such that the first post 61 is threadedly engaged in the screw hole 313. Since the second post 62 has an outer diameter substantially the same as a width of the guide groove 422, the second post 62 is inserted into the guide groove 422 to abut against an inner wall of the guide groove 422.

Figure 6:
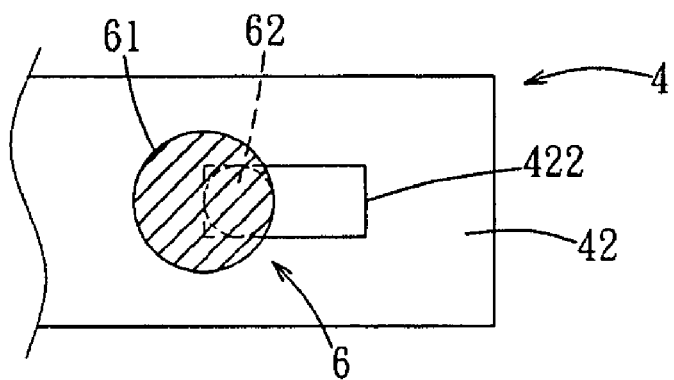
FIG. 6 is a schematic side view of a guide groove portion of the first preferred embodiment of the position adjusting device according to the present invention, illustrating that centers of first and second posts of an adjusting member lie in the same horizontal plane.
Figure 7:
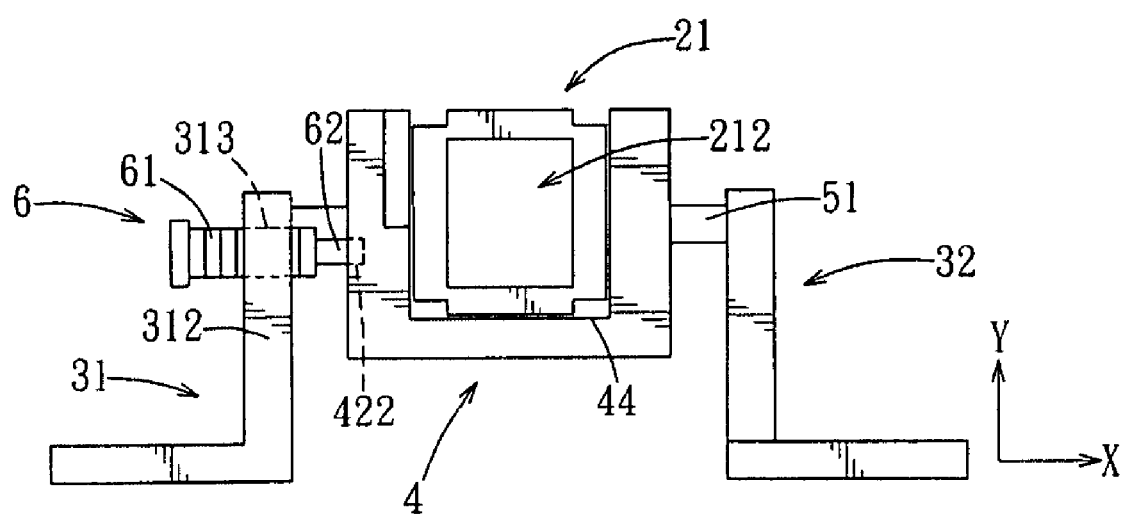
FIG. 7 is a front view of the first preferred embodiment of the position adjusting device according to the present invention to illustrate a bracket of the position adjusting device in a horizontal state.
Figure 8:
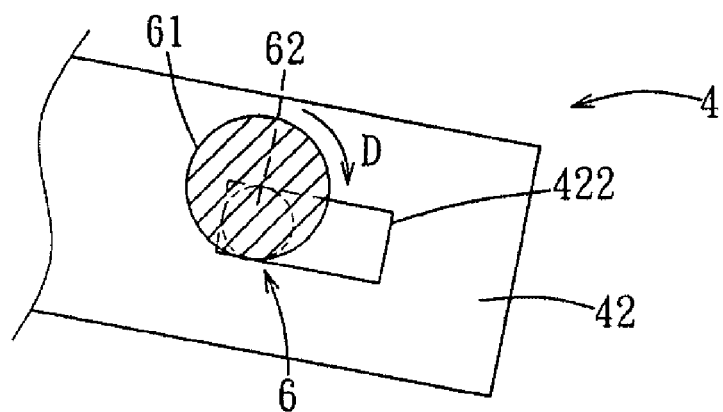
FIG. 8 is a schematic side view of the guide groove portion of the first preferred embodiment of the position adjusting device according to the present invention, illustrating the second post of the adjusting member forcing the bracket to deviate downward.
Figure 9:
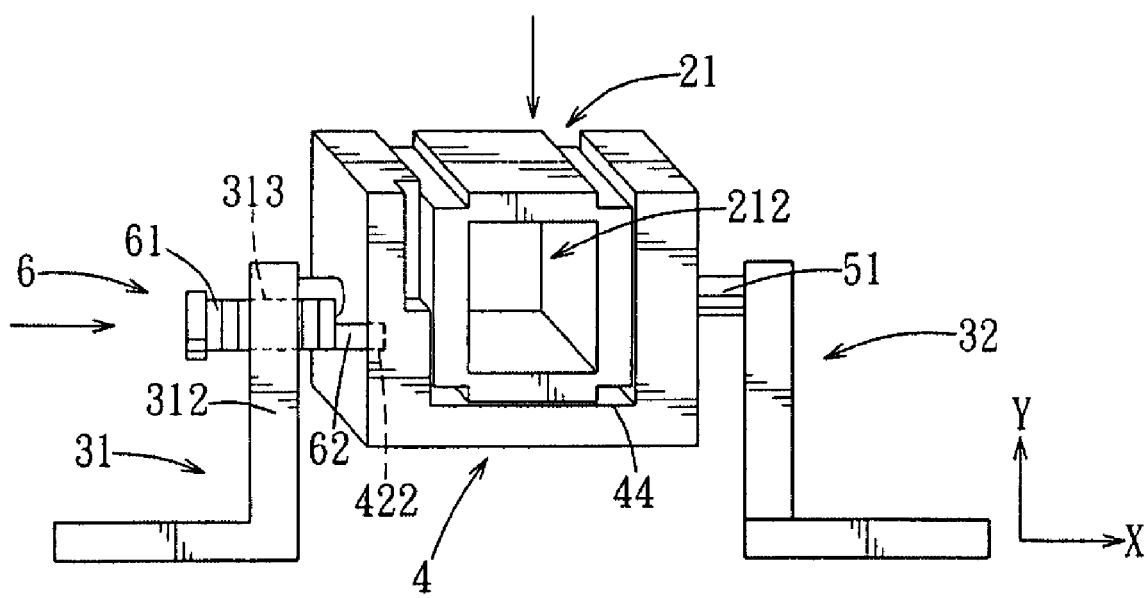
FIG. 9 is a front view of the first preferred embodiment of the position adjusting device according to the present invention to illustrate how the adjusting member drives the bracket to deviate both rightward and downward.
Figure 10:
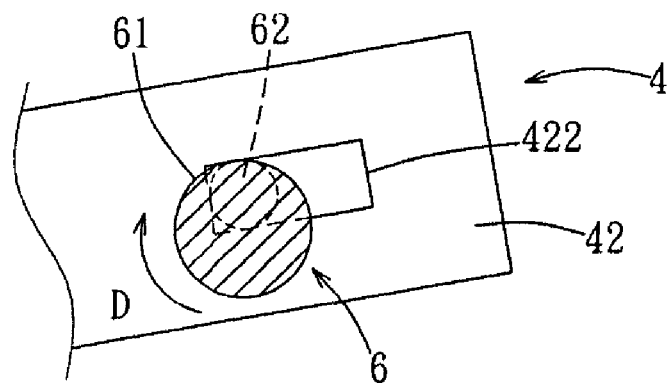
FIG. 10 is a schematic side view of the first preferred embodiment of the position adjusting device according to the present invention to illustrate how the second post of the adjusting member forces the bracket to deviate upward.
Figure 11:
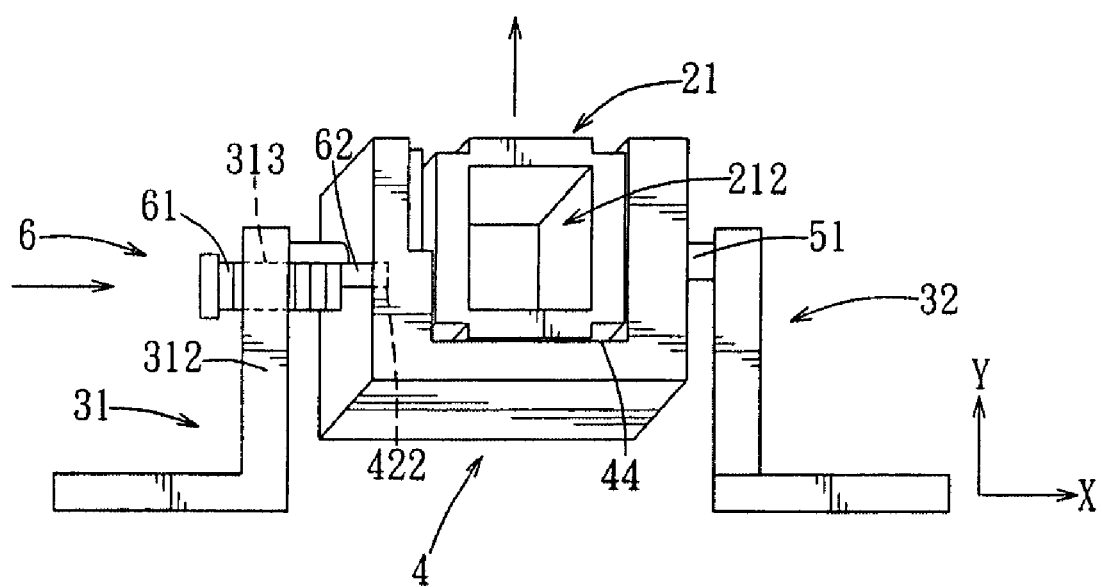
FIG. 11 is a front view of the guide groove portion of the first preferred embodiment of the position adjusting device according to the present invention to illustrate how the adjusting member drives the bracket to deviate both rightward and upward.

As shown in FIGS. 4, 6 and 7, a horizontally extending direction which is perpendicular to an extension direction of the bracket 4 is defined as a first axis (X), and a direction which is perpendicular to both the extension direction of the bracket 4 and the extension direction of the first axis (X) is defined as a second axis (Y). The first axis (X) is a left-and-right direction of the bracket 4, whereas the second axis (Y) is a top-and-bottom-direction of the bracket 4. When the centers of the first and second posts 61, 62 lie in the same horizontal plane, the bracket 4 is in a horizontal state as shown in FIG. 7. As shown in FIGS. 8 and 9, when the adjusting member 6 s turned in a direction indicated by arrow D (see FIG. 8) so as to be rotated about 90 degrees, the adjusting member 6 pushes the bracket 4 along the first axis (X) so that the second open end 44 thereof deviates to the right. At the same time, since the outer diameter of the second post 62 is substantially the same as the width of the guide groove 422, turning of the second post 62 forces the bracket 4 to deviate downward along the second axis (Y), so that the second open end 44 of the bracket 4 is simultaneously adjusted to deviate rightward and downward to permit rightward and downward fine-tuning of the light exit 212 of the integration rod 21. As shown in FIGS. 10 and 11, the adjusting member 6 is subsequently rotated in the direction of arrow D (see FIG. 10) so as to be rotated about 180 degrees. The adjusting member 6 in this state continues to push the bracket 4 along the first axis (X) so that the second open end 44 deviates further to the right, but with the second post 62 forcing the bracket 4 to deviate upward along the second axis (Y), thereby simultaneously adjusting the second open end 44 of the bracket 4 to deviate rightward and upward to permit rightward and upward fine-tuning of the position of the light exit 212 of the integration rod 21. By fine-tuning the position of the light exit 212 of the integration rod 21, the light spot of the illuminating beam 221 (see FIG. 3) which is irradiated through the light exit 212 is accurately aligned with a chip area (not shown) of the digital micro-mirror device 26 (see FIG. 3).

As shown in FIG. 4, due to the outward slanting configuration of the two resilient pins 51, when the adjusting member 6 applies a force to one of the lateral walls 42 proximate to the second open end 44 during fine-tuning of the bracket 4, the bracket 4 deviates by using the two resilient pins 51 proximate to the first open end 43 as pivot points, so that the bracket 4 as a whole is fine-tuned easily. In addition, when the adjusting member 6 is rotated in a reverse direction so as to move to the position shown in FIG. 7, by means of the resilient restoration force generated as a result of resilient deformation of the two resilient pins 51, the bracket 4 is restored to the horizontal state shown in FIG. 7. Since the arrangement of the two resilient pins 51 and one adjusting member 6 can permit fine-tuning of the bracket 4 along two axial directions to deviate rightward and downward or rightward and upward, complexity of structural design is reduced to render the present invention suitable for production using molds.

In addition, the two resilient pins 51 may also be configured to be disposed along the first axis (X) such that the two resilient pins 51 are respectively perpendicular to both the lateral wall 42 and the first lateral plate 312 and perpendicular to both the lateral wall 42 and the second lateral plate 322. The present invention should not be limited to the outward slanting configuration of the two resilient pins 51 in this embodiment.

Figure 12:
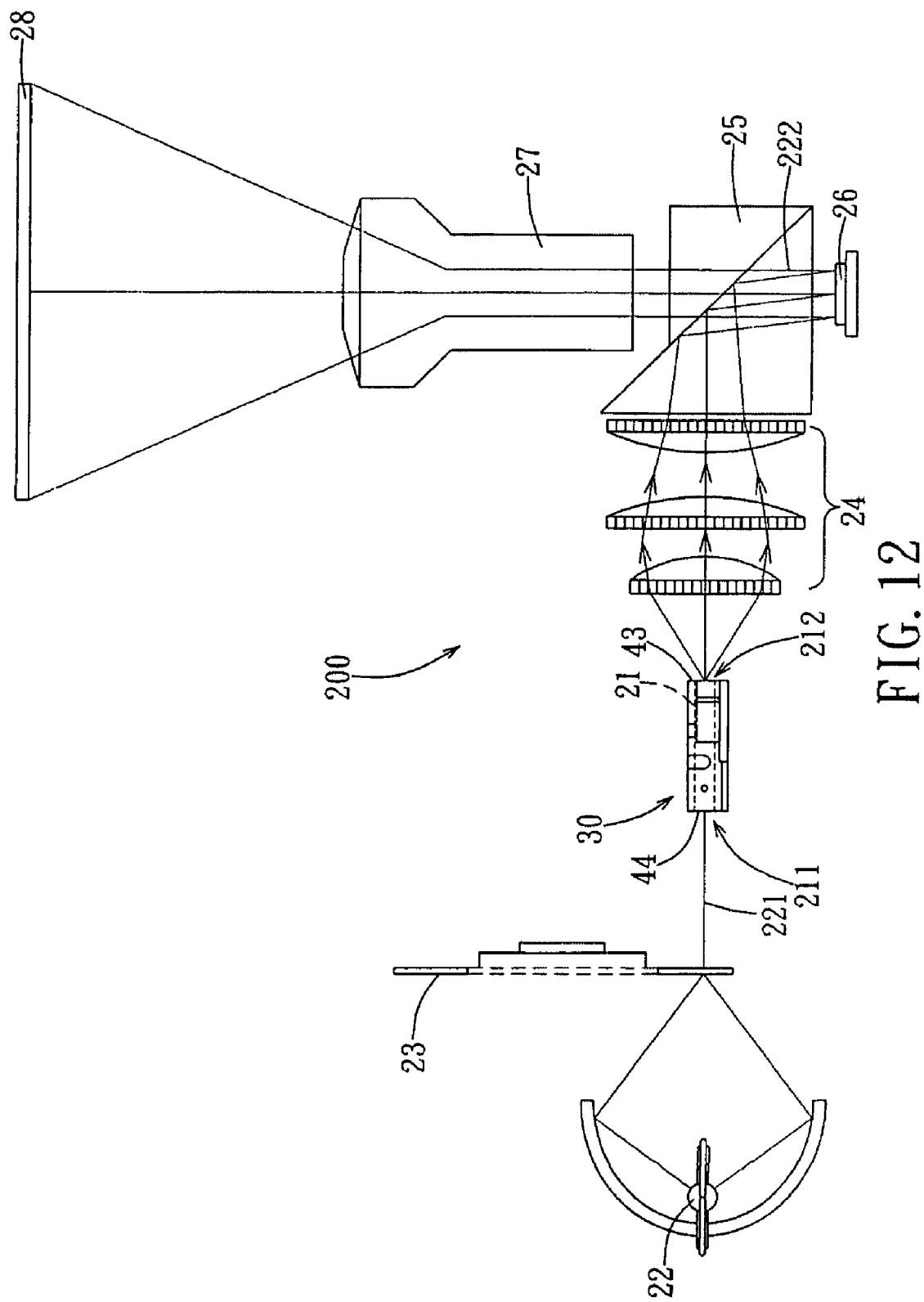
FIG. 12 is a schematic view of a second preferred embodiment of a position adjusting device according to the present invention when applied to an optical system, the position adjusting device being adapted to fine-tune the position of a light entrance of an integration rod.

FIG. 12 is a schematic view of a second preferred embodiment of a position adjusting device 30 according to the present invention when applied to an optical projector system 200. The second preferred embodiment is substantially similar to the first preferred embodiment in overall construction and manner of adjustment, the difference residing merely in the direction of arrangement of the position adjusting device 30. The position adjusting device 30 in this embodiment is reversed, with a first open end 43 and a second open end 44 corresponding in position to a relay lens unit 24 and a color wheel 23, respectively. A light entrance 211 and a light exit 212 of the integration rod 21 are defined to be located respectively at the second open end 44 and the first open end 43 of the bracket 4. By virtue of the reversed arrangement of the position adjusting device 30, the position of the light entrance 211 of the integration rod 21 is fine-tuned such that the light entrance 211 receives more of the illuminating beam 221, thereby reducing light leakage and enhancing light utilization rate.

Figure 13:
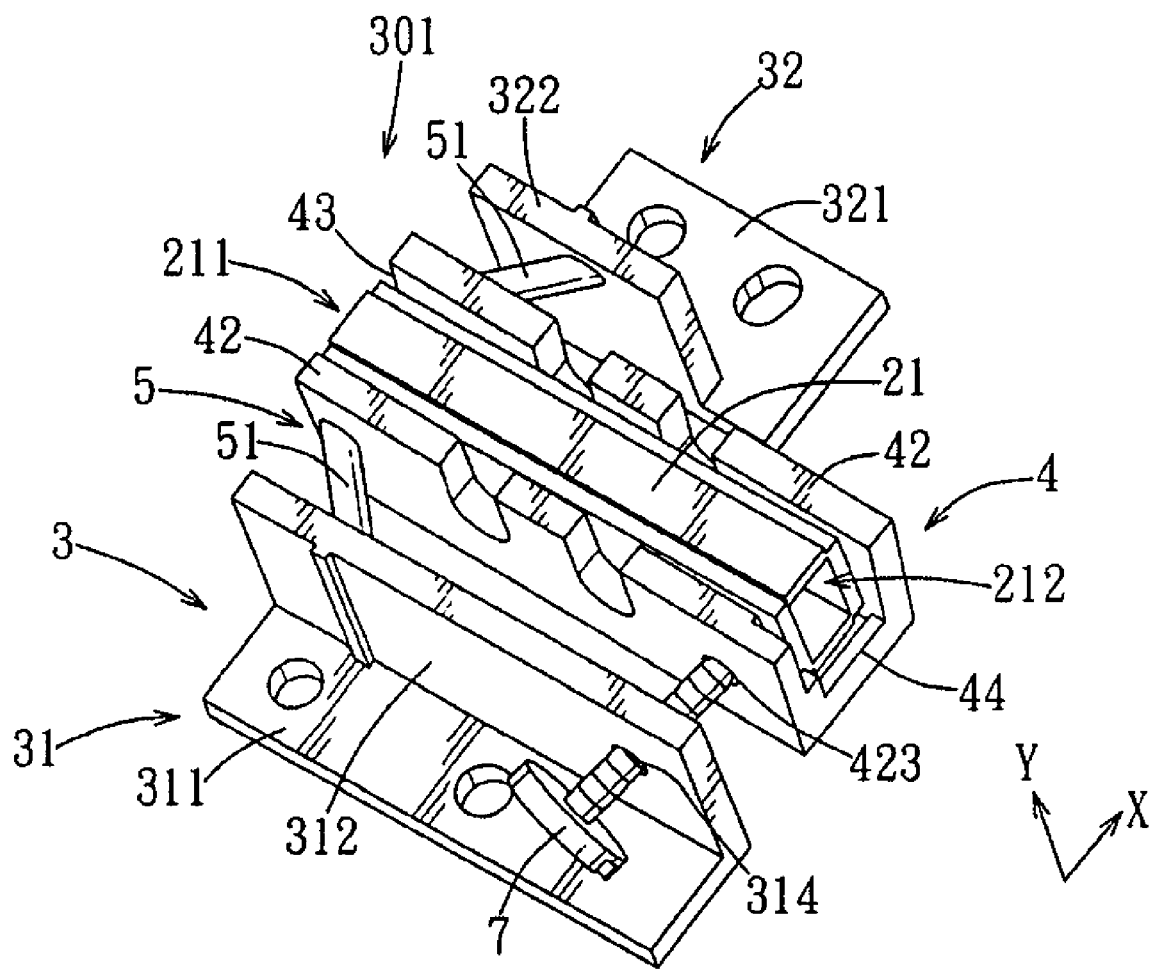
FIG. 13 is a perspective view of a third preferred embodiment of a position adjusting device according to the present invention.
Figure 14:
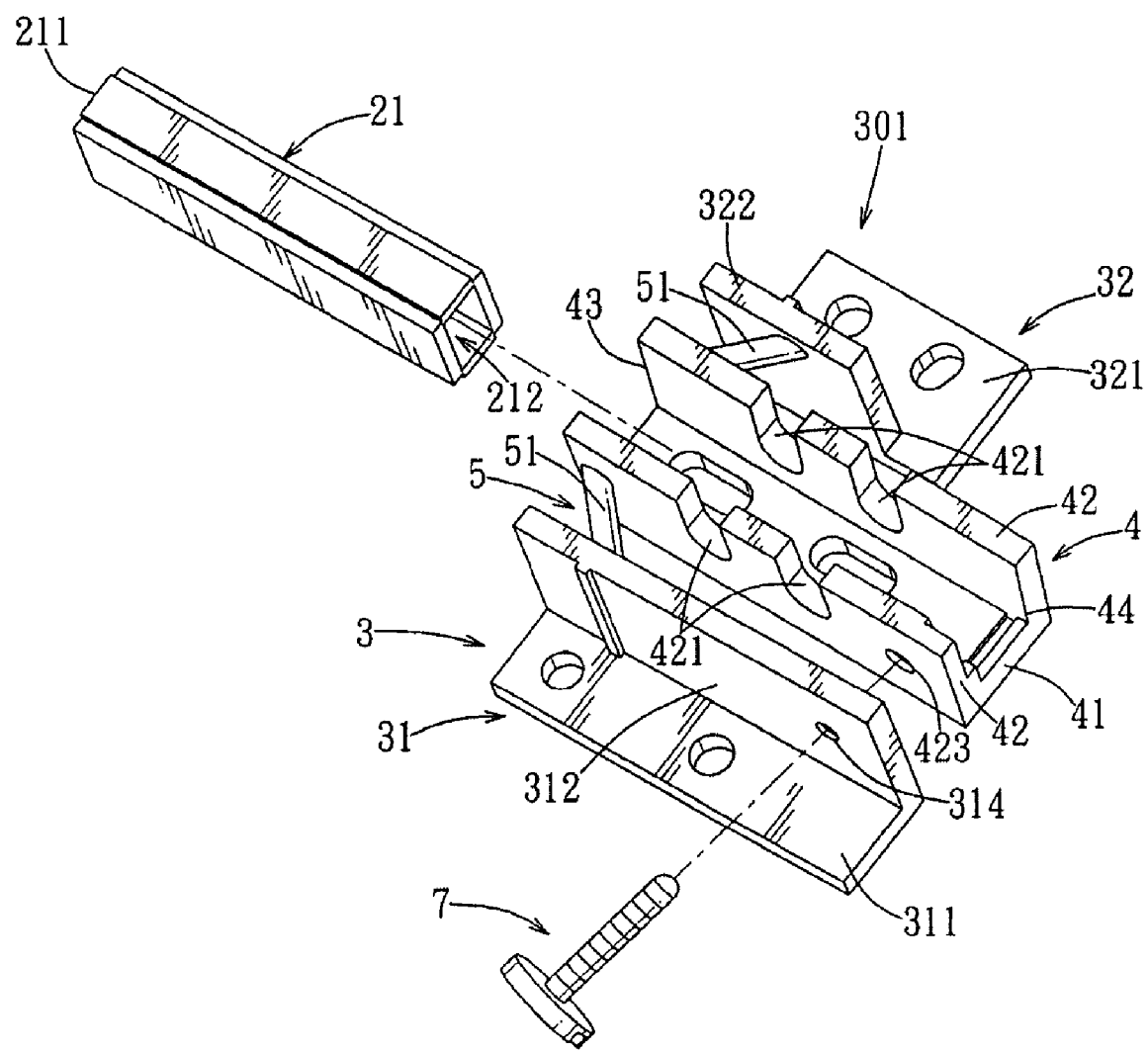
FIG. 14 is an exploded perspective view of the third preferred embodiment of the position adjusting device according to the present invention to illustrate the arrangement relationship between the position adjusting device and the integration rod.
Figure 15:
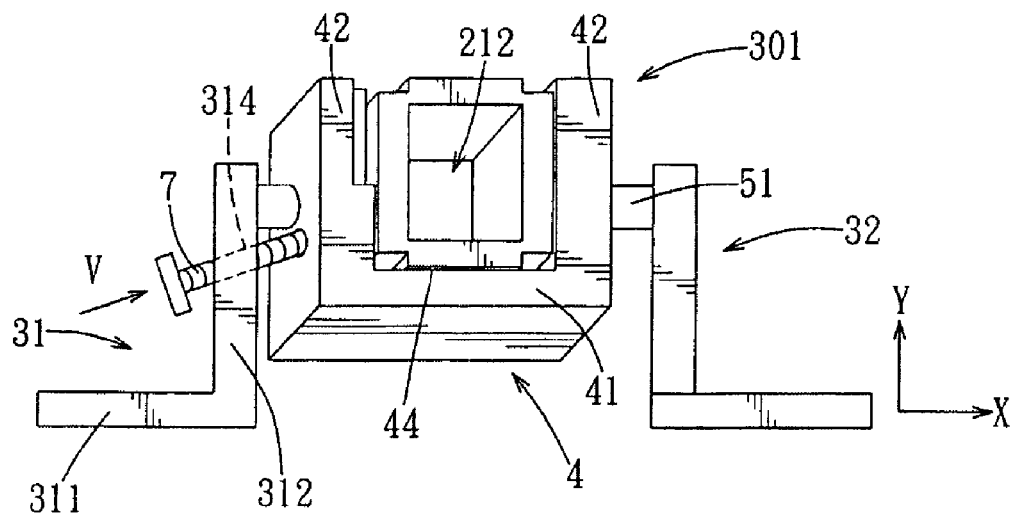
FIG. 15 is a front view of the third preferred embodiment of the position adjusting device according to the present invention to illustrate how an adjusting member drives a bracket to deviate both rightward and upward.

FIGS. 13, 14 and 15 show a third preferred embodiment of a position adjusting device 301 according to the present invention. The position adjusting device 301 in this embodiment is substantially similar to that in the first preferred embodiment in overall construction, but with the configuration of the adjusting member 7 being different.

A first lateral plate 312 of a first base body 31 has an oblique screw hole 314 that extends in a direction toward both a top end and a second open end 44 of a bracket 4, and a lateral wall 42 of the bracket 4 which is proximate to the first lateral plate 312 has a retaining groove 423 facing toward the first lateral plate 312. The adjusting member 7 is a screw that is threadedly engaged in the oblique screw hole 314, a distal end of the screw abutting against an inner wall of the retaining groove 423. By rotating the adjusting member 7 to cause the adjusting member 7 to move in a direction indicated by arrow V (see FIG. 15), the adjusting member 7 pushes the bracket 4 so that the second open end 44 of the bracket 4 deviates to the right along the first axis (X) and deviates upward along the second axis (Y) at the same time so as to fine-tune the position of a light exit 212 of an integration rod 21 rightward and upward. In addition, the position adjusting device 301 may also be arranged reversely so as to fine-tune the position of the light entrance 211 of the integration rod 21.

Figure 16:
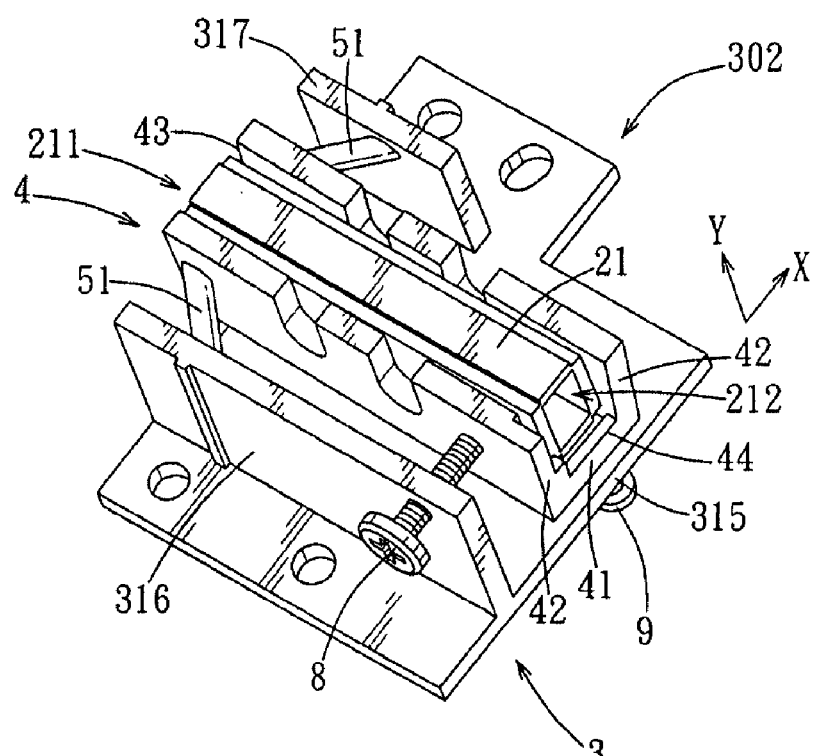
FIG. 16 is a perspective view of a fourth preferred embodiment of a position adjusting device according to the present invention.
Figure 17:
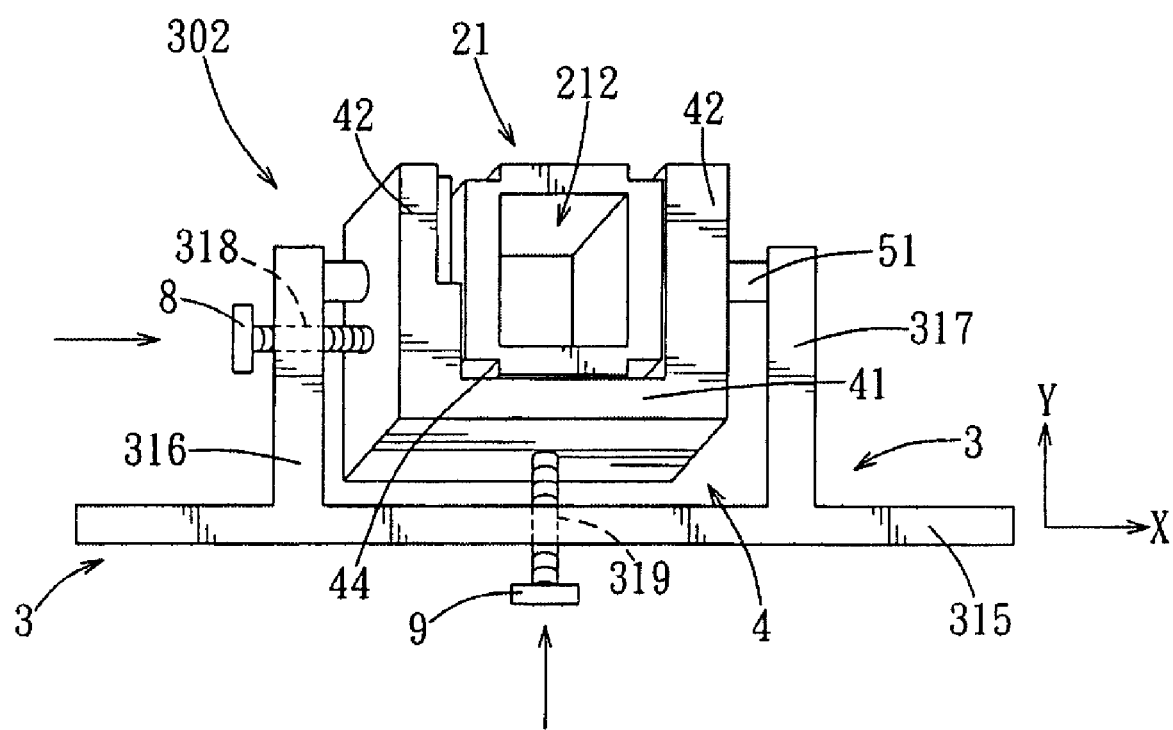
FIG. 17 is a front view of the fourth preferred embodiment of the position adjusting device according to the present invention to illustrate how an adjusting member drives a bracket to deviate both rightward and upward.

FIGS. 16 and 17 show a fourth preferred embodiment of a position adjusting device 302 according to the present invention. The position adjusting device 302 in this embodiment is substantially similar to that in the first preferred embodiment in overall construction, but with the design of the adjusting member being different.

A base unit 3 includes a base plate 315, and a first lateral plate 316 and a second lateral plate 317 that extend in a same direction from a top face of the base plate 315 in an oppositely spaced-apart relationship and that are perpendicular to the base plate 315. The first lateral plate 316 has a first screw hole 318 proximate to a front side thereof. The base plate 315 has a second screw hole 319 proximate to a front side thereof. The position adjusting device 302 includes a first adjusting member 8 and a second adjusting member 9 that are respectively screws. The first adjusting member 8 is threadedly engaged in the first screw hole 318, and has a distal end abutting against a lateral wall 42 of a bracket 4. The second adjusting member 9 is threadedly engaged in the second screw hole 319, and has a distal end abutting against the bottom wall 41 of the bracket 4. By rotating the first adjusting member 8 to push the bracket 4 along a first axis (X) so that a second open end 44 of the bracket 4 deviates rightward, and by rotating the second adjusting member 9 to push the bracket 4 along a second axis (Y) so that the second open end 44 of the bracket 4 deviates upward, a light exit 212 of an integration rod 21 is fine-tuned rightward and/or upward. In addition, the position adjusting device 302 may also be arranged reversely so as to fine-tune the position of the light entrance 211 of the integration rod 21.

In sum, in the above-described embodiments, due to the arrangement of the two resilient pins 51 of the connecting mechanism 5, the adjusting member 6, 7 are used to drive the bracket 4 to deviate along both the first axis (X) and the second axis (Y) simultaneously. On the other hand, the configuration of the first and second adjusting members 8, 9 permits fine-tuning along a single axial direction or fine-tuning along two axial directions to fine-tune the position of the light entrance 211 or the light exit 212 of the integration rod 21 while reducing the complexity of structural design and rendering the present invention suitable for production using molds. Thus, the intended objects of the present invention are positively achieved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

We claim:

1. A position adjusting device adapted for mounting an integration rod and for adjusting position of the integration rod, said position adjusting device comprising:
   a base unit including first and second lateral plates that are oppositely spaced-apart and that extend in a same direction;
   an bracket being elongated and disposed between said first and second lateral plates, said bracket being adapted for mounting the integration rod and including a first open end and a second open end opposite to said first open end;
   a connecting mechanism including two resilient pins connected respectively between said bracket and said first lateral plate and between said bracket and said second lateral plate, each of said resilient pins being proximate to said first open end of said bracket; and
   an adjusting member extending through said first lateral plate and abutting against one side of said bracket that is proximate to said second open end, said adjusting member being capable of driving said bracket to move along both a first axis and a second axis perpendicular to said first axis, both of said first and second axes being perpendicular to an extension direction of said bracket.

2. The position adjusting device according to claim 1, wherein said bracket includes a guide groove oriented toward said first lateral plate, said first lateral plate having a screw hole corresponding in position to said guide groove, said adjusting member being an eccentric screw that threadedly engages said screw hole and that abuts against an inner wall of said guide groove.

3. The position adjusting device according to claim 2, wherein said guide groove is substantially rectangular and has an extension direction the same as the extension direction of said bracket, said adjusting member including a first post threadedly engaged in said screw hole, and a second post formed on a distal end of said first post and abutting against said inner wall of said guide groove, said second and first posts having centers that do not coincide.

4. The position adjusting device of claim 3, wherein said second post has an outer diameter substantially the same as a width of said guide groove, said second post rotatably abutting against said inner wall of said guide groove.

5. The position adjusting device according to claim 2, wherein said first axis is the same as the extension direction of said adjusting member, said adjusting member being capable of pushing said bracket along said first axis such that said bracket moves along both said first axis and said second axis to adjust the position of said second open end of said bracket.

6. The position adjusting device of claim 1, wherein said resilient pins extend respectively from two opposite sides of said bracket proximate to said first open end toward said second open end and slantingly outward to connect respectively to said first and second lateral plates.

7. The position adjusting device according to claim 1, wherein said first lateral plate has an oblique screw hole that extends slantingly toward both said second open end and a top end of said bracket, and said adjusting member is a screw that threadedly engages said oblique screw hole and that abuts against said bracket.

8. The position adjusting device according to claim 7, wherein said bracket includes a retaining groove facing toward said first lateral plate and having an inner wall abutted by a distal end of said adjusting member.

9. A position adjusting device adapted for mounting an integration rod and for adjusting position of the integration rod, said position adjusting device comprising:
   a base unit including a base plate, and first and second lateral plates that extend in a same direction from said base plate in an oppositely spaced-apart relationship and that are perpendicular to said base plate;
   a bracket being elongated and disposed between said first and second lateral plates, said bracket being adapted for mounting the integration rod and including a first open end and a second open end opposite to said first open end;
   a connecting mechanism including two resilient pins connected respectively between said bracket and said first lateral plate and between said bracket and said second lateral plate, each of said resilient pins being proximate to said first open end of said bracket;
   a first adjusting member extending through said first lateral plate and abutting against one side of said bracket that is proximate to said second open end, said first adjusting member being capable of driving said bracket to move along a first axis perpendicular to an extension direction of said bracket; and
   a second adjusting member extending through said base plate and abutting against the other side of said bracket that is proximate to said second open end, said second adjusting member being capable of driving said bracket to move along a second axis perpendicular to the extension direction of said bracket and said first axis.

10. The position adjusting device according to claim 9, wherein said first lateral plate has a first screw hole, and said first adjusting member is a screw that is threadedly engaged in said first screw hole and that abuts against said one side of said bracket.

11. The position adjusting device according to claim 9, wherein said base plate has a second screw hole, and said second adjusting member is a screw that is threadedly engaged in said second screw hole and that abuts against the other side of said bracket.

12. The position adjusting device according to claim 9, wherein said resilient pins extend respectively from said opposite sides of said bracket proximate to said first open end toward said second open end and slantingly outward to connect respectively to said first and second lateral plates.

* * * * *